United States Patent

Sano et al.

[11] Patent Number: 6,051,198
[45] Date of Patent: Apr. 18, 2000

[54] CATALYST FOR PURIFYING FUMIGATION EXHAUST GASES AND A METHOD OF PURIFYING FUMIGATION EXHAUST GASES

[75] Inventors: Kunio Sano, Ako; Kazuyoshi Nishikawa; Kazunori Yoshino, both of Himeji; Kazumi Okuhara, Tamayu-cho, all of Japan

[73] Assignee: Nippon Shokubai Co., Ltd., Osaka, Japan

[21] Appl. No.: 08/860,464

[22] PCT Filed: Dec. 27, 1995

[86] PCT No.: PCT/JP95/02749

§ 371 Date: Jul. 7, 1997

§ 102(e) Date: Jul. 7, 1997

[87] PCT Pub. No.: WO96/20786

PCT Pub. Date: Jul. 11, 1996

[30] Foreign Application Priority Data

Jan. 5, 1995 [JP] Japan .......................................... 7-371
Dec. 20, 1995 [JP] Japan .................................... 7-331905
Dec. 25, 1995 [JP] Japan .................................... 7-337267

[51] Int. Cl.[7] ..................................................... C01B 7/00
[52] U.S. Cl. ........................................ 423/240 S; 588/213
[58] Field of Search ....................... 423/240 S; 502/304; 588/213; 95/142

[56] References Cited

U.S. PATENT DOCUMENTS

| 4,113,660 | 9/1978 | Abe et al. .............................. 502/340 |
| 4,221,768 | 9/1980 | Inoue et al. .......................... 423/213.2 |
| 4,440,631 | 4/1984 | Togari et al. .............................. 208/112 |
| 5,238,656 | 8/1993 | Tajima et al. ......................... 423/240 S |
| 5,283,041 | 2/1994 | Nguyen et al. ....................... 423/245.1 |
| 5,451,388 | 9/1995 | Chen et al. ........................... 423/240 R |
| 5,552,129 | 9/1996 | Farnos et al. ........................ 423/239.2 |

FOREIGN PATENT DOCUMENTS

| 0 415 145 A1 | 3/1991 | European Pat. Off. . |
| 0 544 282 A1 | 6/1993 | European Pat. Off. . |
| 5-23598 | 2/1993 | Japan . |
| 6-165915 | 6/1994 | Japan . |
| 7-299329 | 11/1995 | Japan . |
| 7-318036 | 12/1995 | Japan . |
| 8-24572 | 1/1996 | Japan . |
| WO 90/13352 | 11/1990 | WIPO . |

*Primary Examiner*—Steven P. Griffin
*Assistant Examiner*—Stuart L. Hendrickson
*Attorney, Agent, or Firm*—Oblon, Spivak, McClelland, Maier & Neustadt, P.C.

[57] ABSTRACT

A catalyst of the present invention is adapted for purifying fumigation exhaust gases, and comprises, as a catalyst component A, a metal oxide containing at least one, or a composite oxide containing two or more metals selected from the group consisting of Ti, Si and Zr; and, as a catalyst component B, an oxide containing at least one selected from the group consisting of V, Cu, W and Cr; and has an average micropore diameter in the range of 0.010 to 0.070 $\mu$m, a total micropore volume in the range of 0.30 to 0.60 ml/g, and a specific surface area in the range of 50 to 200 $m^2$/g. The use of this catalyst makes it possible to economically and efficiently purify fumigation exhaust gas.

16 Claims, 2 Drawing Sheets

CATALYST FOR PURIFYING FUMIGATION EXHAUST GASES AND A METHOD OF PURIFYING FUMIGATION EXHAUST GASES

This application is the National Stage of International Application No. PCT/JP95/02749, filed Dec. 27, 1995.

FIELD OF THE INVENTION

The present invention relates to a catalyst for rendering fumigation exhaust gases harmless after their use in the extermination of bacteria and insects from foodstuffs such as fruits and vegetables and cereals, or timber, soil etc., and to a method for effectively purifying fumigation exhaust gases using such a catalyst. In particular, it relates to a catalyst for purifying fumigation exhaust gases by the efficient decomposition of fumigation components such as methyl bromide, chloropicrin, contained in said fumigation exhaust gases.

BACKGROUND OF THE INVENTION

Methods of fumigation involve filling a closed space with gaseous chemicals (fumigants) to eliminate harmful organisms. They are mainly applied to imported foodstuffs such as cereals and fruits and vegetables, and timber as a preventive measure against epidemics, as well as to the extermination of bacteria and insects from green house cultivation soil. From the viewpoint of effectiveness and low cost etc., gases containing organohalogen compounds such as methyl bromide, chloropicrin etc. as fumigation components are used in large amounts as the fumigation gases used in these kinds of fumigation methods.

In actual practice, the above-described kind of fumigation gases containing large amounts of organohalogen compounds are released to the atmosphere after use without being first subjected to any treatment to render them harmless. However, in recent years it has become clear that the ozone layer which plays an important role for the earth's environment is being destroyed by the above-mentioned kind of organohalogen compounds, and restrictions on the use and disposal of organohalogen compounds have become severe worldwide. There is therefore a pressing need for the establishment of a method for purifying fumigation exhaust gases by the effective and low cost decomposition of the organohalogen compounds such as methyl bromide and chloropicrin contained in the fumigation exhaust gases.

Methods of effectively decomposing fumigation components in fumigation exhaust gases have been studied for some time, but due to the above-mentioned situation, are now being increasingly studied from various angles. Even though the concentration of fumigation components contained in the fumigation exhaust gases may be in the order of 1 volume percent at the start of their discharge from the cereal fumigation silo, it drops as the discharge is continued to reach a final value in the order of a number of parts per million. It was found to be extremely difficult to effectively decompose and eliminate the fumigation components discharged over such a wide concentration range.

Direct combustion methods, plasma methods, chemical absorption methods, catalytic oxidation methods, and adsorption methods etc. have so far been proposed, but these methods have the following problems.

Firstly, direct combustion methods usually require high temperatures over 600° C., and have the practical problems that running costs such as fuel costs are extremely high, and that extremely harmful halogen gases, such as $Cl_2$, $BR_2$, are generated by the combustion of the organohalogen compounds.

Plasma methods have been actively studied in recent years. However, they consume large amounts of electric power, and require highly expensive noble gases such as helium, argon etc. Accordingly, although they can be said to be suited to the treatment of certain special objects, they are unsuitable as methods for purifying large amounts of fumigation exhaust gases.

Furthermore, with respect to chemical absorption methods, special chemicals are required, and large amounts of waste water are generated which require secondary treatment. Also, the elimination efficiency is low and the method is thus impractical.

The method disclosed in Japanese Patent Application Publication No. Hei 3-289973 is one example of a catalyst oxidation method. With this method, although the organohalogen compounds can be oxidatively decomposed by contact with a composite oxide catalyst, there is the fear that large amounts of carbon monoxide will be generated, and that extremely harmful phosphogenes, bromophosphogenes etc. will be generated through reaction of the carbon monoxide with the halogens, with the consequent problem that an oxidation catalyst has to be further provided in an after-stage.

In adsorption methods, activated carbon is generally used as the adsorbent. This adsorbent has the characteristic that when it is used with respect to low concentration ranges, only a small amount of the catalyst need be used, and it has a long breakthrough time. However, in situations wherein the initial discharge concentration is high, such as with fumigation exhaust gases, not only does the concentration of adsorbed component after adsorption become high but the breakthrough time becomes very short, and in order to overcome these problems, it is necessary to use the adsorbent in extremely large amounts.

The present invention was made in light of the prior art described above, and has as its objective the provision of a catalyst for purifying fumigation exhaust gases with which fumigation exhaust gases can be purified economically and efficiently, as well as a method for purifying fumigation exhaust gases employing said catalyst.

DISCLOSURE OF THE INVENTION

The gist of the present invention lies in a catalyst for purifying fumigation exhaust gases comprising, as a catalyst component A, a metal oxide containing at least one, or a composite oxide containing two or more metals selected from the group consisting of Ti, Zr and Si; and, as a catalyst component B, an oxide containing at least one selected from the group consisting of V, Cu, W and Cr; said catalyst having an average micropore diameter in the range of 0.010 to 0.070 $\mu$m, a total micropore volume in the range of 0.30 to 0.60 ml/g, and a specific surface area in the range of 50 to 200 $m^2/g$.

It is also effective for this catalyst to further include, as a catalyst component C, at least one selected from the group consisting of Pd, Pt, Rh, Ru and Au, or an oxide thereof; and/or, as a catalyst component D, an oxide of at least one selected from the group consisting of Ce, Pr, Nd, Mo and Sn.

On the other hand, the present invention is directed to a method for purifying fumigation exhaust gases whose gist lies in the step of contacting the fumigation exhaust gases with the above-described kind of catalyst to decompose the fumigation components contained in the exhaust gases. This method is a particularly effective method when the fumigation components are methyl bromide and/or chloropicrin.

In one example of a specific embodiment of the method for purifying fumigation exhaust gases, the fumigation components contained in the fumigation exhaust gases are caused to be adsorbed onto the adsorbent to remove the fumigation components from the fumigation exhaust gases; the fumigation components are desorbed from the adsorbent; and the desorbed fumigation components are then subjected to decomposition treatment by contacting them with the above-described catalyst for purifying fumigation exhaust gases. The adsorbent used in this method may, for example, be at least one selected from the group consisting of particulate activated carbon, fibrous activated carbon, particulate zeolite and fibrous zeolite.

In any of the above-described methods, it is effective to employ a construction in which the products of decomposition-elimination of the fumigation components in the fumigation exhaust gases are cooled using a heat exchanger and then introduced into an alkali scrubber. By adopting such a set-up, it is possible to also wash and eliminate acidic gases such as HBr, HCl etc.

BEST MODE FOR CARRYING OUT THE INVENTION

Fumigation exhaust gases are discharged by feeding air into the fumigation system, and thus, as mentioned above, the concentration of fumigation components (fumigants) in the gases which are initially discharged has a high value of about 1 volume percent. The concentration of fumigants decreases rapidly as the discharge time increases (2–4 hours), and by the end of the discharge process, the concentration is in the order of a number of parts per million. The efficient elimination of fumigants such as methyl bromide, whose concentration changes suddenly over a wide range has been extremely difficult.

The inventors of the present invention first studied the problems at high concentration ranges, and then carried out extensive research into means for solving these problems. When the concentration of fumigants such as methyl bromide, chloropicrin etc. exceeds 1000 ppm, then if the fumigants are subjected to oxidative decomposition through contact with an oxidation catalyst, active halogen gases such as $Br_2$, $Cl_2$ are generated in high concentrations, and are adsorbed onto and thereby cover the active sites of the catalyst. This hinders the adsorption of oxygen molecules necessary for oxidative decomposition, thereby reducing the oxidative decomposition power of the catalyst. Furthermore, with the kinds of catalysts described in the above-mentioned Japanese Patent Application Publication No. Hei 3/289973, there is the problem that carbon monoxide is generated in large quantities, and that this carbon monoxide reacts with halogen gases to generate toxic phosgenes and bromophosgenes.

The inventors of the present invention then carried out research from various angles into how to overcome these problems. As a result, they discovered that a catalyst including, as catalyst component A, a metal oxide of at least one, or a composite oxide including two or more metals selected from the group consisting of Ti, Si and Zr; and, as catalyst component B, an oxide including at least one selected from the group consisting of V, Cu, W and Cr, as catalyst component B; and having an average pore diameter in the range of 0.010 to 0.070 $\mu$m, a total pore volume in the range of 0.30 to 0.60 ml/g, and a specific surface area in the range of 50 to 200 $m^2/g$, was extremely effective, thereby realizing the present invention.

On the other hand, the inventors of the present invention also studied the problems at low concentration ranges, and carried out extensive research into means for solving these problems. When, for example, in the case of a cereal silo, the fumigation components in the latter half of the fumigation exhaust gas discharge process have reached a low concentration, or when the concentration of fumigation components contained in the fumigation exhaust gases has a low value of 1000 ppm right from the start (such as in the case of fumigation exhaust gases discharged after the fumigation of green house cultivation soils), it is technically possible to directly purify the exhaust gases using a purifying device packed with catalyst. However, it has been found that this method is not very practical one, since the heat recovery is small due to the small heat of combustion, resulting in high fuel costs in order to maintain the oxidative-decomposition temperature.

The inventors of the present invention then carried out research with a view to solving this problem. As a result thereof, they came to the idea that it would be good to first adsorb the fumigation components onto an adsorbent made from activated carbon, zeolite etc. to once remove the fumigation components from the fumigation exhaust gases; feed hot air to the adsorbent in an amount $\frac{1}{5}$ to $\frac{1}{15}$ that of the exhaust gases in order to desorb the adsorbed fumigation components; introduce this hot air into a purifying device packed with catalyst and carry out oxidative decomposition; if necessary, remove the heat using a heat exchanger; remove acidic gases such as HBr, HCl etc. using an alkali scrubber; and then release the purified gas to the atmosphere. Several kinds of materials such as particulate activated carbon, fibrous activated carbon, particulate zeolite, fibrous zeolite etc. can be used as the adsorbent. These can be used singly or as a mixture of two or more types thereof. Furthermore, there are no limitations regarding the form of the adsorbent used, and in addition to the particulate and fibrous forms mentioned above, it is also possible to use adsorbent integrally formed to have a honeycomb form.

With large scale fumigation equipment that is used frequently, such as in the case of the fumigation of silos for imported cereals etc., or fumigation of warehouses for fruits and vegetables etc., it is desirable to do the following. Fumigation exhaust gas purifying equipment having catalyst packed therein, and adsorption equipment having adsorbent packed therein are provided in combination. Then at high concentration ranges at the start of the fumigation exhaust gas discharge process, the fumigation exhaust gases are directly introduced into the purifying equipment packed with catalyst to purify them. When the concentration has decreased in the latter stages of the process, the fumigation exhaust gases are fed into the adsorption equipment to purify them, the fumigation components are desorbed from the adsorbent using hot air in an amount $\frac{1}{5}$ to $\frac{1}{15}$ that of the amount of the exhaustion gases, and then the gas enriched with desorbed fumigation components is purified by introducing it into the purifying equipment packed with catalyst.

On the other hand, in the case of equipment which is relatively small in scale and which is only operated with small frequency, such as that used for the fumigation of green house cultivation soil, the combination of fumigation exhaust gas purifying equipment and adsorption equipment is extremely difficult from the economical point of view. In such cases, it is desirable to provide a transportable adsorber and to carry out adsorption of the fumigation exhaust gases as necessary using this adsorber. With an operation of this small scale, purifying equipment could be provided communally at a society or regional group etc. Then after an adsorber has been used at each green house, it can be transported to the place where the purifying equipment has been provided, connected to the purifying equipment, and subjected to desorption using hot air to thereby regenerate the adsorbent. At the same time, the desorbed fumigation gas components can be introduced to the catalyst and subjected to oxidative decomposition, followed by purifying of the acidic gases using an alkali scrubber.

The catalyst of the present invention comprises at least a catalyst component A and a catalyst component B. The catalyst component A is a metal oxide of at least one metal, or a composite oxide containing two or more metals selected from the group consisting of Ti, Si and Zr. The composite oxide is a solid acid and has excellent properties with respect to its action to remove halogens from the fumigation components such as methyl bromide, chloropicrin etc. Furthermore, it also has the property that it is excellent in terms of its selectivity with respect to hydrohalides generated by the reaction of halogens with hydrogen.

Catalyst component B, which also makes up the catalyst of the present invention, contains an oxide containing at least one selected from the group consisting of V, Cu, W and Cr. This catalyst component B enhances the properties of the above-described composite oxide (catalyst component A). In particular, the dehalogenation and formation of hydrohalides at low temperature conditions is made possible. This catalyst component may be a mixture of oxides of the above-described metals, or it may be formed as a composite oxide.

As mentioned above, the catalyst used in the present invention comprises at least a catalyst component A and a catalyst component B. However, the inclusion, as necessary, of at least one selected from the group consisting of Pd, Pt, Rh, Ru and Au or the oxide(s) thereof as a catalyst component C is also effective. This catalyst component C exhibits the effects of suppressing the generation of harmful substances such as carbon monoxide, phosgene and side-produced organohalogen compounds, and raising the perfect oxidation ratio. Where necessary, the inclusion of an oxide of at least one selected from the group consisting of Ce, Pr, Nd, Mo and Sn (as a catalyst component D) in addition to, or instead of catalyst component C is also effective. This catalyst component D is added to improve the heat resistance and activity of catalyst component A and catalyst component B.

There are no particular limitations with respect to the ratios of each catalyst component A–D in the catalyst of the present invention, but when catalyst components A and B are used, it is preferred that catalyst component A be present in an amount of about 75–98 weight percent based on the total of the catalyst components. If the amount of catalyst component A is less than 75 weight percent, then there is an undesirable drop in the formability of the catalyst, and if the amount of catalyst component A exceeds 98 weight percent, there is an undesirable reduction in the activity of the catalyst. When catalyst component C is also included, it is preferred that it be included in an amount of 0.01 to 10 weight percent based on the total weight of catalyst components A and B. Furthermore, when catalyst component D is included, it is preferred that it be included in an amount of 1 to 15 weight percent based on the total weight of catalyst components A and B.

In addition to the above-described component requirements, it is required that the catalyst of the present invention also fulfill the following requirements: average micropore diameter of the catalyst: 0.01 $\mu$m–0.070 $\mu$m; total micropore volume: 0.30–0.60 ml/g; specific surface area: 50–200 m$^2$/g. Studies by the inventors of the present invention with respect to the effect of the form of the catalyst on the fumigation exhaust gases have shown that a catalyst fulfilling each of the above-described requirements displays excellent properties with respect to oxidative decomposition of the fumigation components such as methyl bromide, chloropicrin etc. The reason for this effect has not been completely understood, but it is thought that the above-described requirements probably play an important role with respect to the oxidation reaction on the surface of the catalyst and the action of adsorption of the halogens (Br, Cl etc.), which are generated as a result of this reaction, on the active sites of the catalyst.

The preferred ranges for the above-described requirements are as follows: average micropore diameter: 0.015 $\mu$m–0.035 $\mu$m; total micropore volume: 0.40–0.50 ml/g; specific surface area: 80–160 m$^2$/g. The term "average pore diameter" refers to the average diameter calculated from the micropore distribution as measured by a mercury injection method (method in which mercury is forced under pressure into the pores of the catalyst). The total micropore volume refers to the total volume of the micropores as measured by the mercury injection method.

In cases where the initial exhaust concentration is high, as with fumigation exhaust gases, the partial pressure of the halogens (Br, Cl etc.), which are generated upon decomposition on the catalyst is high, and these halogens tend to be readily adsorbed onto and cover the active sites of the catalyst. If the active sites of the catalyst become covered with these halogens, the adsorption of oxygen molecules, which are necessary for the oxidative-decomposition, is hindered causing a reduction in the activity of the catalyst. Accordingly, in order to maintain the activity of the catalyst, the halogens have to be rapidly separated from the active sites of the catalyst. The above-described requirements are believed to play an important function in this action.

With respect to the form of the catalyst of the present invention, spherical forms, pellet forms and honeycomb forms can be used. Integrally formed honeycomb type catalysts are preferred. The reason therefor is as follows.

After fumigation, air is blown into the silo after wheat, corn etc. has been subjected to fumigation treatment inside the silo, to chase out the fumigants. At this time, a lot of dust is generated from the wheat, corn etc. and is expelled together with the exhaust gases. This dust present in the exhaust gases collects on the layer of catalyst packed into the reactor, thereby causing increases of the pressure drop. Furthermore, the dust collected on the catalyst becomes carbonized due to the surrounding temperature and the oxidation of the catalyst, with the fear that it may cause accidents by ignition. Accordingly, it is necessary to use a catalyst having the kind of shape with which dust does not collect inside the catalyst layer. The collection of dust is difficult to avoid with the conventional pellet catalysts, or the conventional type of short length honeycomb catalysts made by washcoating a cordierite carrier.

In contrast thereto, with a honeycomb type catalyst which has been integrally formed, it is possible to freely select the openings of the catalyst by changing the forming die, and the catalyst can be formed to have a length in the order of up to 1 m. By using a catalyst having this kind of form, the various types of dust present in the gases rapidly pass through the vertical cell of catalyst, thereby making it possible to prevent the collection of dust inside the catalyst layer.

It is preferred that the space velocity of the gas at the time of treating the fumigation exhaust gases with the above-described catalyst, be set in the range of about 1000 to 20000 hr$^{-1}$, and more preferably in the range of about 2000 to 10000 hr$^{-1}$. It is preferred that the catalyst temperature at this time be in the range of about 200 to 500° C., more preferably in the range of about 250 to 450° C.

Figure 1:
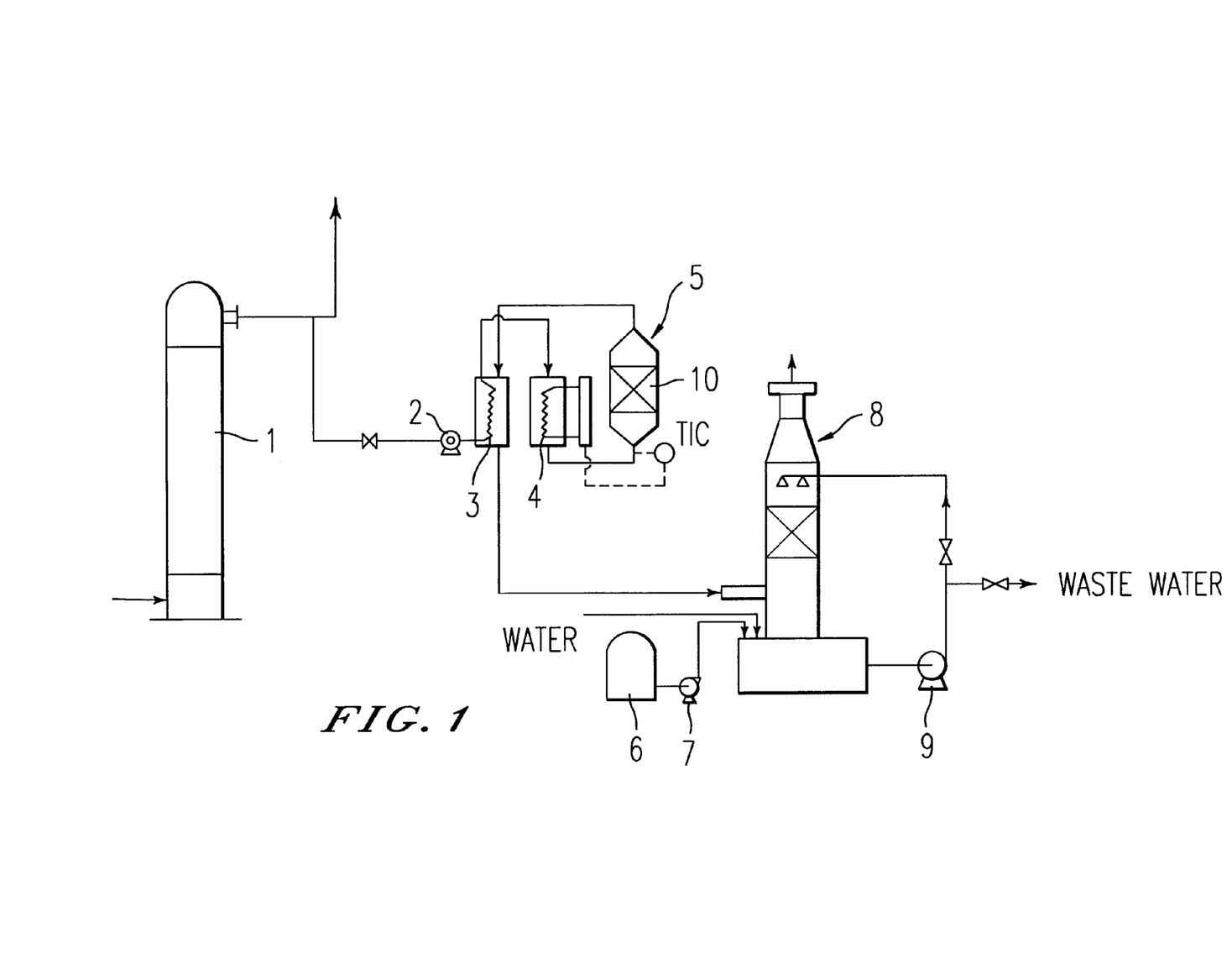
FIG. 1 shows a schematic diagram of a construction of fumigation exhaust gas purifying equipment for carrying out a method of the present invention.

The present invention will be described in more detail with reference to the figures. FIG. 1 is a schematic diagram showing a construction of fumigation exhaust gas purifying equipment for carrying out a method of the present invention. In this FIG. 1, 1 designates a fumigation silo, 2 a blower, 3 a heat exchange unit, 4 a heater, 5 a reactor, 6 a tank for storing alkali solution, 7 a pump, 8 an alkali scrubber, 9 a circulation pump, and 10 a catalyst for purifying the fumigation exhaust gases. In the fumigation exhaust gas purifying equipment shown in FIG. 1, catalyst 10 for purifying the fumigation exhaust gases is first packed into reactor 5, and then fumigation exhaust gases whose temperature has been adjusted using a temperature indicating controller (TIC) are introduced into the reactor.

Figure 2:
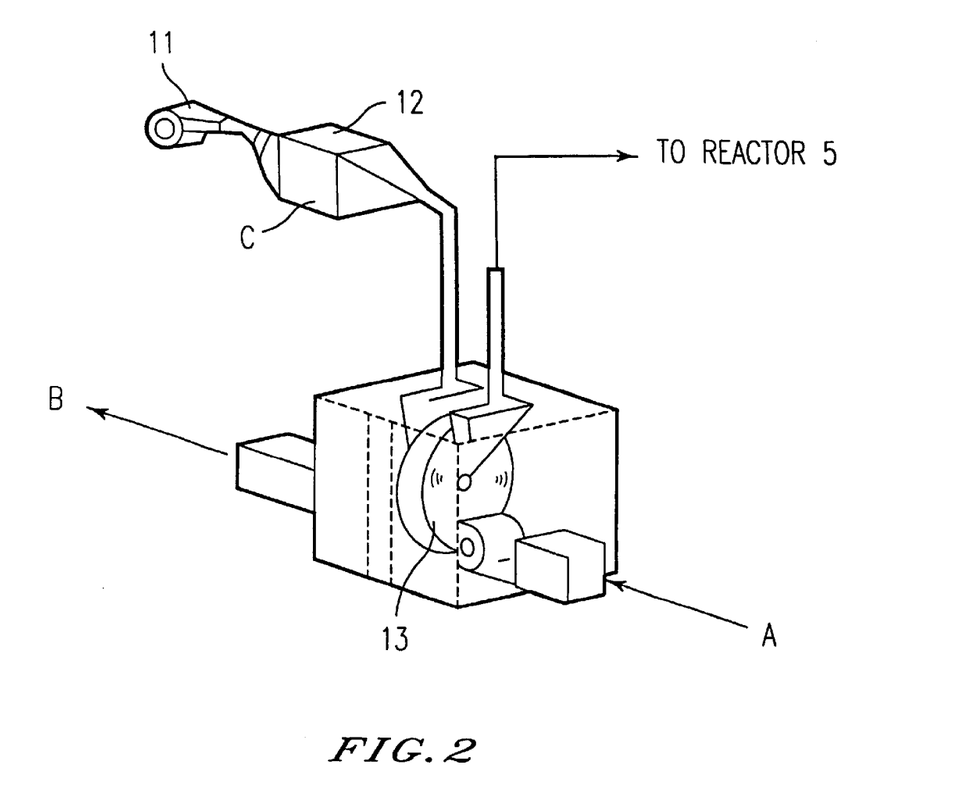
FIG. 2 shows a schematic diagram of a construction of a rotating type adsorption device.

FIG. 2 shows a schematic diagram of a construction of a rotating type adsorption device. In the figure, 11 designates a regeneration blower, 12 a heater, and 13 a rotatable honeycomb-shaped adsorbent. In the rotating type adsorption device shown in FIG. 2, fumigation exhaust gas A from for example, a fumigation silo etc. is introduced into honeycomb-shaped adsorbent 13 wherein the fumigation components become adsorbed. The gas remaining after the fumigation components have been adsorbed is expelled as purified gas B. The fumigation components which have been adsorbed onto honeycomb-shaped adsorbent 13 are desorbed by the introduction using regeneration blower 11 of hot air, which has been heated by heating unit 12, into the honeycomb-shaped adsorbent 13; and are thereafter fed into catalyst type purifying device (afore-mentioned reactor 5) where they are subjected to oxidative decomposition. In FIG. 2, C designates steam which is the heat source for heating unit 12. Other than steam, it is also possible to use an electric heater as the heat source.

EXAMPLE 1

Imported corn was subjected to fumigation using methyl bromide as the fumigant. The fumigation exhaust gases were introduced into the fumigation exhaust gas purifying equipment shown in the above-described FIG. 1. The entering and leaving gas is analyzed over a period of time. The catalyst 10 for purifying the fumigation exhaust gases which was packed into the reactor was prepared according to the following method.

First, a binary composite oxide containing titanium and silicon (TiO$_2$—SiO$_2$) was prepared by the following method. 153 litres of titanyl sulfate (solution of TiOSO$_4$ in aqueous sulfuric acid (TiO$_2$:25%/litre) was mixed with 400 litres of water. Next 24 kg of Snowtex-O (silica gel made by Nissan Kagaku, contains 30 wt % of SiO$_2$) was added thereto. Ammonia water was then added dropwise, whilst stirring the solution and whilst maintaining its temperature at 30° C., until the pH reached 7, whereafter it was aged by leaving it to stand for 2 hours.

The TiO$_2$—SiO$_2$ gel obtained in this way was then filtered and washed with water, followed by drying for 10 hours at 200° C. It was then calcined for 3 hours at 500° C. The composition of the resulting powder (hereunder referred to as "TS-1 powder") was TiO$_2$/SiO$_2$=4 (molar ratio) in terms of the oxides.

Next, 8.4 kg of oxalic acid was dissolved in 18 litres of water, and then 4.28 kg of ammonium metavanadate was added to and dissolved in this solution. To the resulting solution was added and mixed 30 kg of the above-described TS-1 powder and 1.5 kg of starch as a forming auxiliary agent, and the resulting mixture was well kneaded using a kneader. After kneading whilst adding an appropriate amount of water, the mixture was extruded into a 150 mm honeycomb-shaped piece having a hydraulic diameter of each opening (diameter of through pores)of 2.8 mm and a frontal open rate (rate of hole area) of 70%, which was then dried for 6 hours at 120° C. Thereafter, it was subjected to calcination for 6 hours at 450° C. in an atmosphere whose oxygen concentration had been adjusted to 15% or less, to obtain the shaped product. The shaped product obtained in this way is hereafter referred to as "Calcined Product-1".

A catalyst for purifying fumigation exhaust gases was then obtained by causing palladium to be dispersedly carried on Calcined product-1 by immersing Calcined product-1 for one minute in an aqueous solution of palladium nitrate having a palladium concentration of 16 g/litre, followed by drying for 6 hours at 120° C., and calcination for 2 hours at 500° C. in air. The composition of the thus obtained catalyst for purifying fumigation gases was:

TiO$_2$—SiO$_2$ composite oxide:V$_2$O$_5$:Pd=89.3:10.0:0.7 (expressed in percentages by weight).

The catalyst had an average micropore diameter of 0.023 μm; a total micropore volume of 0.45 ml/g; and a BET specific surface area of 110 m$^2$/g.

The thus obtained catalyst for purifying fumigation exhaust gases was packed into the reactor 5 shown in FIG. 1. Exhaust gases from fumigation silo 1 had their pressure increased by blower 2, and their temperature raised to a specific temperature by heat exchange unit 3 and heater 4, and were then subjected to oxidative decomposition using the catalyst for purifying fumigation exhaust gases packed into reactor 5. The exhaust gases which had been subjected to oxidative-decomposition were then cooled via heat exchanger unit 3 and introduced into the bottom of the packed column of alkali scrubber 8. It was then contacted with caustic soda having a pH of 9–11 sprayed from the top of the packed column (flow rate: 3 m$^3$/hr), before being released out of the system. The other treatment conditions employed at this time were set as follows:

(Treatment Conditions)

| | |
|---|---|
| Exhaust gas flow rate: | 60 Nm$^3$/hr |
| Space velocity: | 3000 hr$^{-1}$ |
| Inlet temperature of reactor: | 300° C. |

Gas analysis was carried out over a period of 2 hours from the start of the discharge of gases from fumigation silo 1, to measure the purifying efficiency. The gas analysis was carried out with respect to bromide, hydrogen bromide and carbon dioxide. The results thereof are shown below in FIG. 1. It is clear that the fumigation exhaust were purified efficiently over a long period of time.

TABLE 1

| Time Elapsed from Start from gas Exhaustion from Silo (minutes) | Concentration of methyl bromide in gas exhausted from silo (ppm) | Concentration of fumigants after purifying (at outlet of scrubber) (ppm) | | |
|---|---|---|---|---|
| | | Methyl bromide | Hydrogen Bromide | Carbon Monoxide |
| 20 | 9800 | 38.0 | 1.5 | <2 |
| 40 | 5050 | 19.5 | 0.8 | <2 |
| 60 | 3500 | 13.6 | 0.5 | <2 |
| 80 | 2400 | 7.8 | 0.3 | <2 |
| 100 | 1200 | 4.0 | 0.4 | <2 |
| 120 | 600 | 1.5 | 0.5 | <2 |

EXAMPLE 2

Exhaustion gases expelled after the elapse of two hours from the start of discharge of gases from the fumigation silo was introduced into the rotating type adsorption/desorption device shown in FIG. 2. Then, whilst adsorption was being carried out continuously, hot air heated to 130° C. was blown into the desorption zone of the honeycomb construction. An integrally formed fibrous activated carbon as the honeycomb construction was used at this time. It was made to be one-third adsorption zone, one-third desorption zone and one-third cooling zone.

The desorbed exhaustion gas was introduced to the fumigation gas purifying equipment shown in FIG. 1, and gas analysis was carried out in the same way as Example 1. The treatment conditions employed at this time were set to be as follows:

(Treatment conditions)

| | |
|---|---|
| Exhaust gas flow rate: | 200 Nm³/hr |
| Hot air flow rate for desorption: | 40 Nm³/hr (revolution speed of regenerating rotor: 2 revolutions/hr) |
| Spatial Velocity: | 2000 hr⁻¹ |
| Inlet temperature of reactor: | 300° C. |

Gas analysis was thus carried out over time to measure the purifying efficiency. The gas analysis was carried out with respect to methyl bromide, hydrogen bromide and carbon monoxide, as in example 1. The results are shown in Table 2. It is clear that the arrangement of the rotating type adsorption device was extremely effective in purifying of the fumigation exhaust gases whose concentration of fumigation components had started to decreased.

TABLE 2

| Time Elapsed from Start of gas Exhaustion from silo (minutes) | Concentration of methyl bromide at adsorption-desorption device by activated carbon (ppm) | | | Concentration of fumigation components after purifying (at outlet of scrubber) (ppm) | | |
|---|---|---|---|---|---|---|
| | Inlet gas | Outlet gas | Desorption gas | Methyl bromide | Hydrogen bromide | Carbon monoxide |
| 150 | 300 | 24 | 1500 | 8.0 | 0.5 | <2 |
| 180 | 140 | 5.0 | 675 | 3.5 | 0.4 | <2 |
| 200 | 70 | 3.0 | 320 | 2.0 | 0.3 | <2 |
| 220 | 34 | 2.0 | 160 | 1.0 | 0.3 | <2 |
| 240 | 15 | 1.5 | 76 | <1.0 | 0.2 | <2 |
| 260 | 5 | <1.0 | 10 | <1.0 | 0.1 | <2 |

EXAMPLE 3

Catalysts having different physical properties were prepared, and the methyl bromide decomposition efficiency was investigated.

(Catalyst No. 1)

A powder made from titanium oxide was prepared according to the same method as in Example 1, except that snowtex was not used. The powder of titanium oxide was extruded into a 80 mm lattice shaped honeycomb type piece having a hydraulic diameter of each opening of 2.8 mm and a frontal open rate (rate of hole area) of 70%. It was thereafter dried and calcined to obtain "Calcined product-2".

The thus obtained Calcined product-2 was impregnated in the solution palladium according to the same method as in Example 1 to obtain the catalyst. The composition of this catalyst was:

$TiO_2:V_2O_5:Pd=89.3:10.0:0.7$ (expressed in weight percentages), and the catalyst had an average micropore diameter of 0.01 $\mu$m, a total micropore volume of 0.25 ml/g and a BET specific surface area of 50 m²/g.

(Catalyst No. 2)

The same catalyst as in Example 1 was prepared. The composition was:

$TiO_2$—$SiO_2$ composite oxide:$V_2O_5$:Pd=89.3:10.0:0.7 (expressed in weight percentages), and the catalyst had an average micropore diameter of 0.023 $\mu$m, a total micropore volume of 0.45 ml/g and a BET specific surface area of 110 m²/g.

(Catalyst No. 3)

The powder (TS-1) obtained in Example 1 was used to prepare a catalyst according to the method described hereunder. 0.7 litres of monoethanolamine were mixed with 7 litres of water. 1.03 kg of ammonium paratungstate were added and dissolved in this solution, and then 1.14 kg of ammonium metavanadate were dissolved in the resulting solution, and a uniform solution was prepared. 16 kg of the above-described TS-1 powder were added to this solution, followed by mixing and kneading using a kneader whilst adding water. An extruder was then used to extrude it into an 80 mm lattice-shaped honeycomb type piece having a hydraulic diameter of each opening of 2.8 mm and a frontal open rate (rate of hole area) of 70%. The extruded product was then dried and calcined to obtain "Calcined product-3".

The thus obtained Calcined product-3 was then impregnated in the aqueous solution of palladium nitrate according to the same method as in Example 1, to obtain a catalyst. The composition of the thus obtained catalyst was:

$TiO_2$—$SiO_2$ composite oxide:$V_2O_5$:$WO_3$:Pd=89.3:5.0:5.0:0.7 (expressed in weight percentages), and the catalyst had an average micropore diameter of 0.030 μm, a total micropore volume of 0.50 ml/g and a BET specific surface area of 140 m²/g.

(Catalyst No. 4)

Catalyst No. 4 was prepared according to the same method as that used to prepare catalyst No. 3 except that 0.5 kg of starch was added as a forming auxiliary.

The thus obtained catalyst had the same composition as catalyst No. 3, but had an average micropore diameter of 0.06 μm, a total micropore volume of 0.6 ml/g and a BET specific surface area of 180 m²/g.

Methyl bromide decomposition tests were performed on catalysts Nos. 1 to 4. The results are shown in FIG. 3. The decomposition conditions (laboratory test) were as follows:
(Decomposition test conditions) Inlet temperature of catalyst layer: 250° C., 300° C., 350° C.

| Space velocity: | 3000 hr⁻¹ |
|---|---|
| Gas composition: | 1 vol % methyl bromide and 5 vol % $H_2O$ with the remainder being air. |

TABLE 3

| | Physical Properties | | | | | |
|---|---|---|---|---|---|---|
| Catalyst | Average Micropore Diameter (μm) | Total Micropore Volume (ml/g) | Specific Surface Area (m²/g) | Methyl bromide decomposition efficiency (%) | | |
| | | | | 250° C. | 300° C. | 350° C. |
| Catalyst No. 1 | 0.010 | 0.25 | 50 | 65.5 | 89.0 | 95.5 |
| Catalyst No. 2 | 0.023 | 0.45 | 110 | 85.0 | 99.6 | 99.9 |
| Catalyst No. 3 | 0.030 | 0.50 | 140 | 89.0 | 99.7 | 99.9 |
| Catalyst No. 4 | 0.060 | 0.60 | 180 | 75.0 | 95.8 | 98.0 |

EXAMPLE 4

Catalysts having different physical properties were prepared, and the methyl bromide decomposition efficiency was investigated.

(Catalyst No. 5)

12 kg of 10% monoethanolamine aqueous solution containing 0.86 kg of ammonium metavanadate and 1.79 kg of ammonium paratungstate was added to 20 kg of the powder TS-1 obtained in Example 1. Starch was also added and mixed in as a forming auxiliary, and then the mixture was kneaded together using a kneader. An extruder was used to form the mixture into a 150 mm honeycomb-shaped piece having openings of 2.8 mm, a thickness of 0.5 mm, and a length of 500 mm. This was then dried at 80° C., followed by calcination for 5 hours at 450° C. in air to obtain "Calcined product-4".

The thus obtained Calcined product-4 was then immersed into a mixed aqueous solution of copper nitrate ($Cu(NO_3)_2 \cdot 3H_2O$) and palladium nitrate (this solution having a "CuO" content of 140 g/litre and a "Pd" content of 6 g/litre). It was then dried at 150° C. for 3 hours, followed by calcination in air for 2 hours.

The thus obtained catalyst had a composition of:

$TiO_2$—$SiO_2$ composite oxide:$V_2O_5$:$WO_3$:CuO:Pd= 84.8:3.0:7.0:5.0:0.2 (expressed in weight percentages), and an average micropore diameter of 0.021 μm, a total micropore volume of 0.41 ml/g and a BET specific surface area of 93 m²/g.

(Catalyst No.6)

Catalyst No. 6 was obtained by the same method of preparation used to prepare catalyst No. 5, except that chromium nitrate ($Cr(NO_3)_3 \cdot 9H_2O$) was used instead of copper nitrate.

The thus obtained catalyst had a composition of:

$TiO_2$—$SiO_2$ composite oxide:$V_2O_5$:$WO_3$:$Cr_2O_3$:Pd= 84.4:3.0:7.0:5.0:0.6 (expressed in weight percentages), and an average micropore diameter of 0.032 μm, a total micropore volume of 0.42 ml/g and a BET specific surface area of 100 m²/g.

(Catalyst No.7)

Catalyst No. 7 was obtained by the same method of preparation used to prepare catalyst No. 5, except that cerium nitrate was used instead of copper nitrate.

The thus obtained catalyst had a composition of:

$TiO_2$—$SiO_2$ composite oxide:$V_2O_5$:$WO_3$:$CeO_2$:Pd= 84.4:3.0:7.0:5.0:0.6 (expressed in weight percentages), and an average micropore diameter of 0.025 μm, a total micropore volume of 0.41 ml/g and a BET specific surface area of 94 m²/g.

(Catalyst No.8)

Catalyst No. 8 was obtained by the same method of preparation used to prepare catalyst No. 5, except that neodymium nitrate was used instead of copper nitrate.

The thus obtained catalyst had a composition of:

$TiO_2$—$SiO_2$ composite oxide:$V_2O_5$:$WO_3$:$Nd_2O_3$:Pd= 84.4:3.0:7.0:5.0:0.6 (expressed in weight percentages), and an average micropore diameter of 0.021 μm, a total micropore volume of 0.39 ml/g and a BET specific surface area of 91 m²/g.

(Catalyst No.9)

Catalyst No. 9 was obtained by the same method of preparation used to prepare catalyst No. 5, except that praseodymium nitrate was used instead of copper nitrate.

The thus obtained catalyst had a composition of:

$TiO_2$—$SiO_2$ composite oxide:$V_2O_5$:$WO_3$:$Pr6O_{11}$:Pd= 84.4:3.0:7.0:5.0:0.6 (expressed in weight percentages), and an average micropore diameter of 0.024 μm, a total micropore volume of 0.40 ml/g and a BET specific surface area of 91 m²/g.

(Catalyst No.10)

Catalyst No. 10 was obtained by the same method of preparation used to prepare catalyst No. 5, except that a mixed aqueous solution of copper nitrate and chloroplatinic acid was used instead of a mixed aqueous solution of copper nitrate and palladium nitrate.

The thus obtained catalyst had a composition of:

$TiO_2$—$SiO_2$ composite oxide:$V_2O_5$:$WO_3$:CuO:Pt=84.8: 3.0: 7.0: 5.0: 0.2 (expressed in weight percentages), and an average micropore diameter of 0.022 μm, a total micropore volume of 0.41 ml/g and a BET specific surface area of 95 m²/g.

(Catalyst No. 11)

A binary composite oxide of Ti and Zr was prepared according to the same method as used in Example 1, except that zirconium dichloride oxide ($ZrOCl_2 \cdot 8H_2O$) was used instead of Snowtex.

The thus obtained powder had a composition given by $TiO_2:ZrO_2=4:1$ (molar ratio) in terms of the oxides. The X-ray diffraction chart did not show any of the clear peaks characteristic of $TiO_2$ and $ZrO_2$, and it was clear that it was a composite oxide of Ti and Zr having an amorphous microstructure, from the broad diffraction peak.

This composite oxide powder containing Ti and Zr was used to obtain a honeycomb-shaped catalyst according to the same method of preparation as used for catalyst No. 5. The thus obtained catalyst had a composition of:

$TiO_2$—$ZrO_2$ composite oxide:$V_2O_5$:$WO_3$:CuO:Pd= 84.8:3.0:7.0:5.0: 0.2 (expressed in weight percentages), and an average micropore diameter of 0.015 μm, a total micropore volume of 0.37 ml/g and a BET specific surface area of 80 m²/g.

(Catalyst No. 12)

A ternary composite oxide of Ti, Si and Zr was prepared according to the following method. A ternary composite oxide powder containing Ti, Si and Zr was prepared according to the same method as used in Example 1, except that zirconium dichloride oxide ($ZrOCl_2 \cdot 8H_2O$) was additionally added as a source of zirconium.

The thus obtained powder had a composition given by Ti:Si:Zr=20:4:1 (molar ratio). The X-ray diffraction chart did not show any of the clear peaks characteristic of $TiO_2$, $SiO_2$ and $ZrO_2$, and it was clear that the powder was a composite oxide of Ti, Si and Zr having an amorphous microstructure, from the broad diffraction peak.

This composite oxide powder containing Ti, Si and Zr was used to obtain a honeycomb-shaped catalyst according to the same method of preparation as used for catalyst No. 5. The thus obtained catalyst had a composition of:

$TiO_2$—$SiO_2$—$ZrO_2$ composite oxide:$V_2O_5$:$WO_3$:CuO:Pd= 84.8:3.0:7.0:5.0:0.2 (expressed in weight percentages), and an average micropore diameter of 0.018 μm, a total micropore volume of 0.41 ml/g and a BET specific surface area of 94 m²/g.

(Catalyst No.13)

Catalyst No. 13 was obtained by the same method of preparation used to prepare catalyst No. 5, except that an aqueous solution of copper nitrate was used instead of a mixed aqueous solution of copper nitrate and palladium nitrate.

The thus obtained catalyst had a composition of:

$TiO_2$—$SiO_2$ composite oxide:$V_2O_5$:$WO_3$:CuO=85.0:3.0:7.0:5.0 (expressed in weight percentages), and an average micropore diameter of 0.025 μm, a total micropore volume of 0.40 ml/g and a BET specific surface area of 93 m²/g.

(Catalyst No.14)

Catalyst No. 14 was obtained by the same method of preparation used to prepare catalyst No. 5, except that the CuO concentration of the mixed aqueous solution of copper nitrate and palladium nitrate was changed to 84 g/litre.

The thus obtained catalyst had a composition of:

$TiO_2$—$SiO_2$ composite oxide:$V_2O_5$:$WO_3$:CuO:Pd= 86.8:3.0:7.0:3.0:0.2 (expressed in weight percentages), and an average micropore diameter of 0.030 μm, a total micropore volume of 0.43 ml/g and a BET specific surface area of 105 m²/g.

(Comparative Example 1)

12 litres of water and starch were mixed with 20 kg of the powder (TS-1) obtained in Example 1. The resulting mixture was kneaded together using a kneader, and then kneaded further whilst adding an appropriate amount of water. Then, an extruder was used to form a 150 mm honeycomb-shaped piece having an opening size of 2.8 mm, a thickness of 0.5 mm, and a length of 500 mm. The piece was then dried at 80° C. followed by calcination for 5 hours in air at 450° C., to obtain "Calcined product-5".

The thus obtained Calcined product-5 had an average micropore diameter of 0.06 μm, a total micropore volume of 0.7 ml/g, and a BET specific surface area of 210 m²/g.

(Comparative Example 2)

A commercially available oxidation catalyst comprised of an cordierite carrier having a cell number of 210 cells/inch², and loaded with 150 g of γ-$Al_2O_3$ and 2 g of Pt per litre of catalyst was used.

The above-described catalysts (Catalysts Nos. 5 to 14 and comparative catalysts Nos. 1 and 2) were subjected to methyl bromide decomposition tests. The results thereof are shown in Table 4. The decomposition conditions (bench test) were as follows:

(Decomposition Test Conditions)

| Inlet temperature of catalyst layer: | 250° C., 275° C., 300° C. |
|---|---|
| Space velocity: | 5000 hr⁻¹ |
| Gas composition: | 0.5 vol % methyl bromide and 5 vol % $H_2O$ with the remainder being air. |

TABLE 4

| Catalyst | Methyl bromide Decomposition (%) | | | CO production (%) | | |
|---|---|---|---|---|---|---|
|  | 250° C. | 275° C. | 300° C. | 250° C. | 275° C. | 300° C. |
| Catalyst No. 5 | 97.7 | 99.6 | >99.9 | 0.7 | 0 | 0 |
| Catalyst No. 6 | 71.4 | 97.8 | 99.0 | 0 | 0 | 0 |
| Catalyst No. 7 | 42.5 | 74.0 | 90.9 | 0 | 0 | 0 |
| Catalyst No. 8 | 44.4 | 77.8 | 91.5 | 0 | 0 | 0 |
| Catalyst No. 9 | 43.8 | 78.2 | 90.5 | 0 | 0 | 0 |
| Catalyst No. 10 | 97.6 | 99.6 | >99.9 | 0.1 | 0 | 0 |
| Catalyst No. 11 | 97.6 | 99.6 | >99.9 | 0 | 0 | 0 |
| Catalyst No. 12 | 96.8 | 99.5 | >99.9 | 0 | 0 | 0 |
| Catalyst No. 13 | 97.8 | 99.8 | >99.9 | 1.9 | 0.5 | 0 |
| Catalyst No. 14 | 94.1 | 98.8 | 99.7 | 0.7 | 0 | 0 |
| Comp. Example 1 | — | 9.0 | 15.0 | — | 5.9 | 13.5 |
| Comp. Example 2 | 5 | 20.0 | 60.0 | 1.2 | 0.3 | 0 |

INDUSTRIAL USE OF THE INVENTION

The above-described present invention provides a catalyst for purifying fumigation exhaust gases with which the fumigation exhaust gases can be purified economically and with high efficiency; and the use of this catalyst makes it possible to establish a method with which fumigation exhaust gases can be effectively purified.

We claim:

1. A method for purifying fumigation exhaust gases comprising contacting fumigation exhaust gases with a catalyst to decompose the fumigation components contained in the exhaust gases, wherein the catalyst comprises, as a catalyst component A, a metal oxide of at least one element selected from the group consisting of Ti, Si and Zr, and, as a catalyst component B, an oxide of at least one element selected from the group consisting of V, Cu, W and Cr, said catalyst having an average micropore diameter in the range of 0.010 to 0.070 μm, a total micropore volume in the range of 0.30 to 0.60 ml/g, and a specific surface area in the range of 50 to 200 m$^2$/g, and wherein the fumigation components contained in the fumigation exhaust gases comprise at least one selected from the group consisting of methyl bromide and chloropicrin, and wherein said catalyst can decompose 42.5% or more of methyl bromide from an exhaust gas at 250° C.

2. The method according to claim 1, wherein the catalyst further comprises, as a catalyst component C, at least one element selected from the group consisting of Pd, Pt, Rh, Ru and Au, or an oxide thereof.

3. The method according to claim 1, wherein the catalyst further comprises, as a catalyst component D, an oxide of at least one element selected from the group consisting of Ce, Pr, Nd, Mo and Sn.

4. The method according to claim 1, wherein the products of the decomposition of the fumigation components contained in the fumigation exhaust gases are cooled using a heat exchanger and introduced into an alkali scrubber.

5. The method according to claim 1, further comprising absorbing the components contained in the fumigation exhaust gases onto an adsorbent to remove the fumigation components from the fumigation exhaust gases; desorbing the fumigation components from the adsorbent; then subjecting the desorbed fumigation components to decomposition treatment by contacting them with the catalyst.

6. The method according to claim 5, wherein the adsorbent is not in contact with the catalyst.

7. The method according to claim 1, wherein the catalyst component A is a titanium oxide.

8. The method according to claim 1, wherein the catalyst component B is a vanadium oxide.

9. The method according to claim 2, wherein the catalyst component C is Pd or a Pd oxide.

10. The method according to claim 3, wherein the catalyst component D is a cerium oxide.

11. A method for purifying fumigation exhaust gas, comprising absorbing fumigation components contained in fumigation exhaust gases onto an adsorbent to remove the fumigation components from the fumigation exhaust gases; desorbing the fumigation components from the adsorbent; and subjecting the desorbed fumigation components to decomposition treatment by contacting them with a catalyst, wherein the catalyst comprises, as a catalyst component A, a metal oxide of at least one element selected from the group consisting of Ti, Si and Zr, and, as a catalyst component B, an oxide of at least one element selected from the group consisting of V, Cu, W and Cr, said catalyst having an average micropore diameter in the range of 0.010 to 0.070 μm, a total micropore volume in the range of 0.30 to 0.60 ml/g, and a specific surface area in the range of 50 to 200 m$^2$/g, and wherein the fumigation components contained in the fumigation exhaust gases comprise at least one selected from the group consisting of methyl bromide and chloropicrin, and wherein said catalyst can decompose 42.5% or more of methyl bromide from an exhaust gas at 250° C.

12. The method for purifying fumigation exhaust gases according to claim 11 wherein the adsorbent is at least one selected from the group consisting of particulate activated carbon, fibrous activated carbon, particulate zeolite and fibrous zeolite.

13. The method for purifying fumigation exhaust gases according to claim 11, wherein the products of the decomposition-elimination of the fumigation components contained in the fumigation exhaust gases are cooled using a heat exchanger and introduced into an alkali scrubber.

14. The method according to claim 11, wherein the catalyst further comprises, as a catalyst component C, at least one element selected from the group consisting of Pd, Pt, Rh, Ru and Au, or an oxide thereof.

15. The method according to claim 11, wherein the catalyst further comprises, as a catalyst component D, an oxide of at least one element selected from the group consisting of Ce, Pr, Nd, Mo and Sn.

16. The method according to claim 11, wherein the adsorbent is not in contact with the catalyst.

* * * * *